United States Patent [19]
Tritenne

[11] 3,975,494
[45] Aug. 17, 1976

[54] METHOD OF MAKING SYNTHETIC-RESIN TARGET PIGEON

[76] Inventor: Claude Tritenne, Les Morenes, 01710 Thoiry, France

[22] Filed: Dec. 2, 1974

[21] Appl. No.: 528,894

[52] U.S. Cl. .................................. 264/329; 264/328
[51] Int. Cl.² .......................................... B29B 3/02
[58] Field of Search .......................... 264/328, 329; 273/105.4

[56] References Cited
UNITED STATES PATENTS

| | | | |
|---|---|---|---|
| 2,353,457 | 7/1944 | Goessling | 264/329 X |
| 2,372,630 | 3/1945 | Smith | 264/329 X |
| 3,437,722 | 4/1969 | Cronin | 264/329 X |
| 3,554,552 | 1/1971 | Nixon | 273/105.4 |
| 3,646,187 | 2/1972 | Milam | 264/329 X |
| 3,675,926 | 7/1972 | Misevich | 273/105.4 |
| 3,732,345 | 5/1973 | Amos | 264/329 |

OTHER PUBLICATIONS
Hagerman, Edward M., Weld–line Fracture in Molded Parts, *PLASTICS ENGINEERING*, Oct. 1973, pp. 67 to 69 relied on.

*Primary Examiner*—Richard R. Kucia
*Attorney, Agent, or Firm*—Karl F. Ross; Herbert Dubno

[57] ABSTRACT

A target pigeon is made of synthetic resins such as polystyrene and polymethacrylate which are not mutually soluble. The resins are heated and cooled successively prior to injection molding of the pigeon so that they coagulate together and form a mass of tiny flakes constituting the body of the pigeon. These resins are injected into the mold cavity at a plurality of locations so that the pigeon has interfaces constituting weak lines that allow it readily to disintegrate when struck transversely, but which do not decrease the longitudinal strength so the pigeon can be launched by means of an explosion from a blank cartridge or the like.

6 Claims, 2 Drawing Figures

METHOD OF MAKING SYNTHETIC-RESIN TARGET PIGEON

FIELD OF THE INVENTION

The present invention relates to the fabrication of a target pigeon. More particularly this invention concerns a clay pigeon made of synthetic-resin material and adapted to be launched into the air by the explosion of a blank cartridge or the like.

BACKGROUND OF THE INVENTION

Pigeon targets as used in trap and skeet shooting are known which are made of synthetic-resin material and which are launched or fired by means of a blank cartridge so that they are often referred to as self-propelled pigeons. Such pigeons usually have at least one of two failings. Either the pigeon has a tendency to break apart as it is being launched so that it is useless as a target, or it is so durable that it is difficult to ascertain if indeed hit has been made by the shooter. It is essential that the target be launched in a single piece, but that when a hit is made it disintegrates at least partially so that there can be no dispute as to whether the particular shot was a hit or a miss. Thus, the pigeon, which has a longitudinal axis corresponding to the direction in which it is launched, must be able to withstand considerable longitudinal pressures while being relatively brittle when stressed transverse to this axis.

Another disadvantage of such synthetic-resin pigeons is that they are relatively expensive. This is due principally to the fact that the molding process requires that the particle be held in the mold until it has polymerized or crystallized, as otherwise it loses its shape. Thus production is relatively slow and, hence, expensive.

OBJECTS OF THE INVENTION

It is therefore an object of the present invention to provide an improved target pigeon of the above-described general type, as well as an improved method of making such a pigeon.

Another object is the provision of a target pigeon which can withstand considerable longitudinal forces so it can be launched by a blank cartridge or similar explosive device, but which nonetheless disintegrates readily when hit transversely.

Yet another object is the provision of a method for producing synthetic-resin target pigeons relatively inexpensively.

SUMMARY OF THE INVENTION

These objects are attained according to the present invention in a target pigeon formed as a heterogeneous mixture of two synthetic resins of different types which are not mutually soluble. Thus these resins coagulate together so to form a nonhomogeneous aggregate or agglomerate.

In accordance with the present invention the two resins may be polystyrene and polymethacrylate in weight proportions of between 2.5 : 1 and 1.5 : 1; and the molding takes less than 3 seconds.

According to yet another feature of this invention the mixture is heated prior to molding thereof sinusoidally. Thus the temperature of the mixture is raised and lowered so that as a result of this so-called cracking, the resins coagulate in zones. This thermal treatment which precedes the injection-molding of the target pigeons can take place in accordance with another feature of this invention in the screw chamber of an injection molding apparatus which is, thus, heated to different temperatures along its length.

According to yet another feature of this invention the mold cavity for each pigeon is connected to the extruder via a plurality of independent filling passages so that the resin is introduced into the cavity at several locations and spreads out in the cavity as several masses which meet at interfaces. These interfaces later constitute weak seams in the pigeon that allow it to shatter readily when stressed transversely. The blend of resins in the pigeons according to the present invention is effected such that resins form into microscopic flakes lying parallel to the walls of the pigeon so as to give this pigeon considerable strength in the longitudinal direction, yet making it very brittle when stressed transversely. The pigeons may be of the hollow cove type with perforated walls or of the delta-wing type.

Thus when such a pigeon is launched by the explosion of a blank cartridge, subjecting the pigeon to a force on the order of approximately 20kg/cm$^2$, it nonetheless remains intact. However the various static tensions present in the pigeon and aligned with the direction of travel of the pigeon are susceptible to transverse forces. Thus when struck transversely by the shot or shell of the shooter the effect is a vibration or resonance in the form of a shock wave which quickly is propagated longitudinally and is concentrated at the interfaces or seams described above so as readily to cause the disintegration of the target pigeon. These forces are at least partially the result of removing the pigeon longitudinally from the mold when it is still malleable and allowing it to polymerize or crystallize outside the mold. The configuration of the pigeon is shown in French Pat. Nos. 1,403,044 and 2,038,655.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
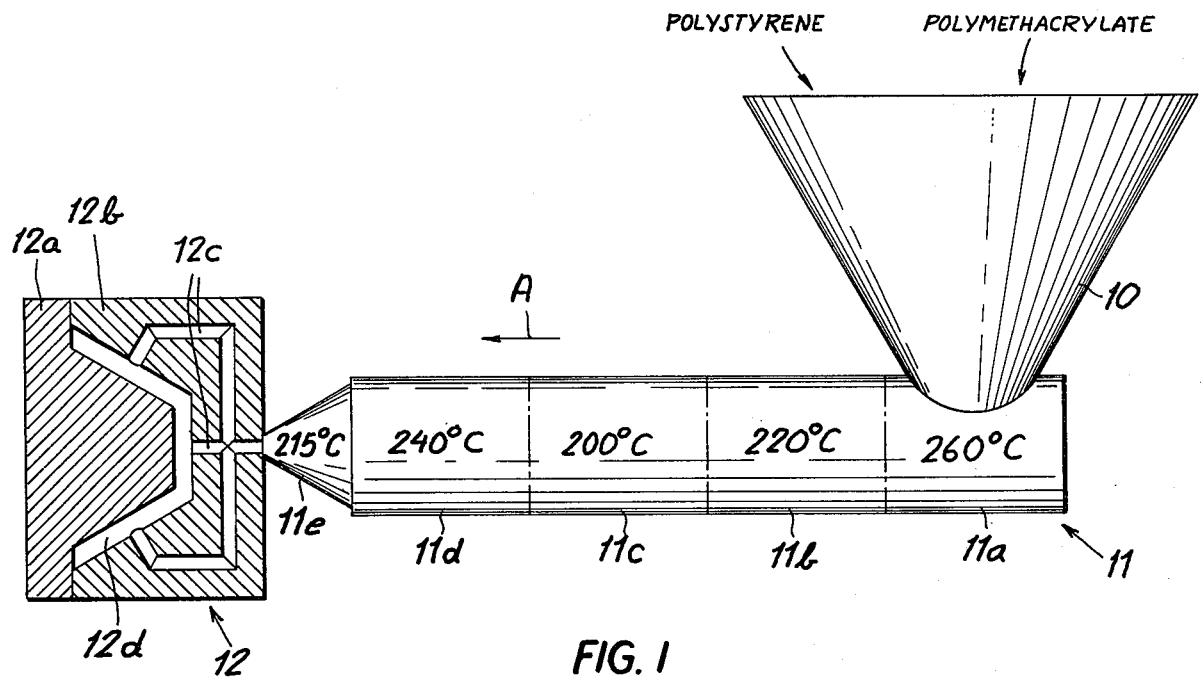
FIG. 1 is a side diagrammatic view of a system for carrying out the method according to the present invention.

As shown in FIG. 1 polystyrene and polymethacrylate are mixed in the hopper 10 of a screw-type extruder 11 which masticates and advances the two resins in a direction indicated by arrow A toward a two-part mold 12. The housing of the extruder 11 is subdivided into four longitudinally spaced zones 11a–d which are each heated to a respective different temperature. The zone 11a is heated to 260°C, the zone 11b to 220°C, the zone 11c to 200°C, and the zone 11d to 240°C. The mixture of resins leaves the nozzle 11e of the housing at 215°C.

The mold 12 has two parts 12a and 12b, the latter formed with a plurality of passages 12c which open into the mold cavity 12d and cause the molded target pigeon to be formed with a plurality of seams which, as described above, increase its frangibility in a direction transverse to the direction at which is also the direction of travel for the launched pigeon. The entire injection procedure according to the present invention is carried out very rapidly, an overall elapsed time of two seconds being found most efficient. In this manner the polymerization only takes place truly once the pigeon is demolded.

Figure 2:
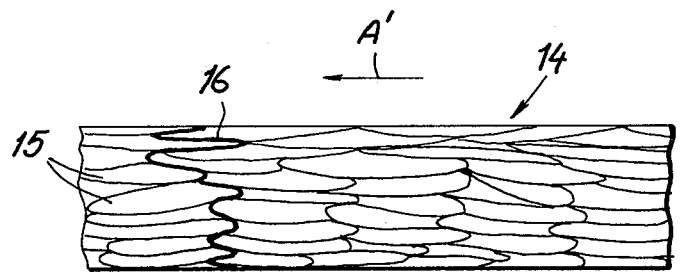
FIG. 2 is a sectional view of a small detail of a target pigeon according to the present invention.

As shown in FIG. 2 the method according to the present invention causes the resins to subdivide in the wall 14 of the pigeon into a plurality of tiny flakes 15 which are separate but which lie generally parallel to the longitudinal axis A' of the wall. A seam 16 created by the injection of the resin at several locations in the mold cavity 12d is shown.

I claim:

1. A method of making a target pigeon comprising the steps of:
   a. blending two synthetic resins which are not mutually soluble;
   b. after step (a) sinusoidally heating the blend of synthetic resins to alternately raise and lower the temperature thereof as a function of time to form an aggregate therefrom; and thereafter
   c. injecting said aggregate simultaneously through a plurality of filling passages into a mold under pressure to form a pigeon with a multiplicity of interfaces wherein said pigeons possess great longitudinal strength relative to their lateral strength.

2. The method defined in claim 1 wherein said resins are blended such that each resin is reduced to a multiplicity of microscopic flakes.

3. The method defined in claim 1 wherein said resins are molded by injection molding.

4. The method defined in claim 3 wherein said injection molding takes less time than 3 seconds.

5. The method defined in claim 3, further comprising the step of demolding said pigeon while same is still malleable.

6. The method defined in claim 1 wherein said resins are polystyrene and plymethacrylate mixed in proportions of between 2.5:1 and 1.5:1.

* * * * *